United States Patent [19]

Morghen

[11] Patent Number: 4,867,621
[45] Date of Patent: Sep. 19, 1989

[54] INDEXING AND LOCATING TOOLING SUPPORT COMPONENT

[75] Inventor: Manifred Morghen, San Diego, Calif.

[73] Assignee: General Dynamics Corporation, Convair Division, San Diego, Calif.

[21] Appl. No.: 259,085

[22] Filed: Oct. 14, 1988

[51] Int. Cl.⁴ .............................................. B23Q 3/02
[52] U.S. Cl. ..................................... 409/218; 269/58; 269/61; 409/227
[58] Field of Search ............... 409/218, 219, 220, 227; 33/567, 568, 569, 645, 613, 573; 269/53, 48, 49, 50, 58, 60, 61, 54, 47, 309, 310; 248/157, 422, 188.2, 125

[56] References Cited

U.S. PATENT DOCUMENTS

| | | | |
|---|---|---|---|
| 2,424,090 | 7/1947 | Gordinier | 269/310 |
| 3,175,820 | 3/1965 | Schiler | 269/309 |
| 3,430,317 | 3/1969 | Grimoldi et al. | 269/61 |
| 3,537,697 | 11/1970 | Davis | 269/50 |
| 3,565,416 | 2/1971 | Williamson et al. | 269/47 |
| 3,690,641 | 9/1972 | Claycomb | 269/310 |
| 4,067,564 | 1/1978 | Kobane, Jr. | 269/310 |
| 4,538,355 | 9/1985 | Morghen | 33/613 |

FOREIGN PATENT DOCUMENTS

| | | | |
|---|---|---|---|
| 2342207 | 3/1974 | Fed. Rep. of Germany | 269/310 |
| 214323 | 10/1984 | Fed. Rep. of Germany | 269/58 |
| 40240 | 3/1983 | Japan | 269/47 |

*Primary Examiner*—William Briggs
*Attorney, Agent, or Firm*—John R. Duncan; Frank D. Gilliam

[57] ABSTRACT

An indexing and locating component to be used with a fixture for precision machining of parts. The component includes a housing that is positioned on the upper surface of the fixture and which contains a bevel gear arrangement which moves a locating pin arrangement in a predetermined vertical direction to provide a precise locating support point for a workpiece. The gear arrangement may be operated at a position remote from the component.

12 Claims, 1 Drawing Sheet

INDEXING AND LOCATING TOOLING SUPPORT COMPONENT

BACKGROUND OF THE INVENTION

This invention relates to improvements in tooling for precision machining and more particularly, but not by way of limitation, to a removable and replaceable indexing and locating component adapted to be used with a sub-plate for the precision machining of parts.

Numerous types of locating pins are known in the prior art as operable to support a part on a machine or position a workpiece on a tooling jig. These locating pins are often used with a gage plate for setting fixtures and the like, such plates conventionally comprising a base and an accurately formed top surface with a plurality of circumferentially spaced accurately formed and located opening therein. Obviously, such a gage plate is expensive and time consuming to manufacture because each opening must be very accurately located with relation to the other openings. In addition, any changes in temperature in use may cause the gage plate to lose its accuracy.

The prior art locating pins are often of "round" and "relieved" configuration. They are often used together, mounted on a fixture a distance apart corresponding to a distance between two apertures on a workpiece. When a workpiece is placed on the locator pins the round one provides restraint in all directions and the relieved locator is so designed to provide transverse restraint only.

One commonly used prior art relieved locator pin is commonly referred to as a diamond locator, because of its essentially diamond-shaped cross section. In use, however, known prior art locator pins are subject to a number of defects. One class of locator pins are elemental in construction and provide only the most rudimentary type of locator pin. Another type is constructed of many precision machined parts which the require exact assembly and adjustment to function as a locator pin.

Commonly, locator pins of the first type include only a bushing that is press fitted into a hole in a fixture or sub-plate. A locating pin is then inserted into the bushing or is pre-inserted into the bushing prior to it being press fitted into the fixture. Such locator pins while acceptable for some applications are non-adjustable and cannot be easily replaced or interchanged with other pins as the need should arise.

Examples of the latter type of locator pins previously discussed are shown in U.S. Pat. Nos. 2,497,679; 3,158,045; and 3,286,354. Characteristically, this type of locator pin provides for a central bore to be formed in the fixture or sub-plate a plurality of eccentrically formed sleeves are then inserted within one another and rotated until a desired orientation has been achieved to provide the desired locator hole. The sleeves are then locked into position by one or more particularly configured bolts which bear against the outer periphery of one or more of the eccentric sleeves.

The present invention provides a simple, readily manufactured locator pin that may be easily inserted into a fixture and which has a locating pin that may be easily adjusted vertically to provide a precise supporting and indexing point for positioning of a workpiece for machining thereof.

SUMMARY OF THE INVENTION

Briefly stated, the present invention provides a novel supporting and locating component adapted to be used with a sub-plate for precision machining of parts and includes a hollow box housing that is adapted to be positioned upon the upper planar surface of a sub-plate in a predetermined position. A locator/support pin means slidably extends through an upper portion of the housing and is adapted to extend above the upper surface of the sub-plate for indexing and supporting a production part that is to be positioned on the sub-plate for machining. Bevel gear means are contained within the box housing and are adapted to cooperate with the housing and the locator means to vertically position the locator means in a predetermined vertical position. Wrench means may be used to drive the bevel gear means from a position either adjacent to the tooling component or from a remote position to vertically position the locator pin means in a desired vertical position. Support means may be provided to assist the wrench means when the wrench means are to be activated from a remote position as when the tooling component is to be placed in hard to reach location.

These and other aspects of the indexing and locating component of the present invention are set forth more completely in the accompanying Figures and the following description.

DETAILED DESCRIPTION OF THE DRAWINGS

Figure 1:
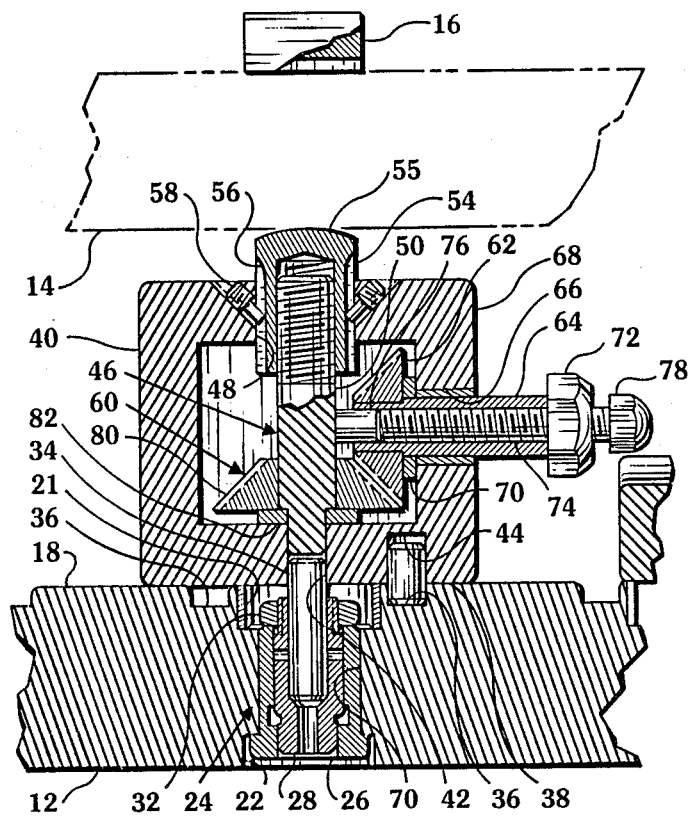
FIG. 1 is a vertical section of an indexing and supporting tooling component constructed in accordance with the present invention.

Referring now to the drawings in detail and in particular to FIG. 1, the reference character 10 generally illustrates an indexing and supporting tooling component constructed in accordance with a preferred embodiment of the present invention and adapted to cooperate with a suitable sub-plate or fixture 12 to correctly position a workpiece 14 shown in dotted outline for clarity of illustration. The workpiece 14 may be held against the component 10 by a suitable strap clamp 16 as is well known in the art.

In a machining set-up, a production part with several tooling planes or a rough tooling surface is usually index-supported by as many as three solid points and various additional support jacks and points which must be adjustable to ensure that the production part is clamped down in a free state without inducing any pre-loaded twist or warp into the part.

The tooling component 10 of the present invention provides an adjustable support anywhere on the sub-plate 12 and also provides a firm non flexible support in critical and especially hard to reach areas. While existing spring jack locks tend to collapse or move at strong clamp pressure and have a short range of vertical movement. The tooling component 10 is positive, will not collapse, and does not need to be fastened or permanently mounted to the sub-plate 12. It can be placed on the sub-plate 12 and can be removed quickly therefrom. Since it can be easily used in remote hard to reach areas, its extended range of vertical movement is especially desirable.

The sub-plate 12 is preferably provided with a planar upper surface 18 that provides an accurate planar surface for fixturing purposes. The sub-plate 12 is provided with suitable vertically extending bores 20 having upper and lower extended portions 21 and 22 that are positioned in predetermined locations on the sub-plate 12 and which are adapted to receive a suitable removable and replaceable indexing and locating tooling component 24 for the purpose of correctly positioning the component 10 of the present invention. An example of a removable and replaceable indexing and locating tooling component 22 that may be used advantageously with the present invention is seen in U.S. Pat. No. 4,538,355, the disclosure of which is incorporated herein by reference.

The locating component 24 which is received within the bore 20 includes a tubular bushing 26 that may be press fitted within the bore 20 and which receives a locator bushing 28 having a suitably threaded upper portion 30 for receiving a lock nut 32. A suitable dowel pin 34 is slip fitted into the locator bushing 28 for locating the component 10 on the upper surface 18 of the sub-plate 12. The sub-plate 12 is provided with a plurality of upwardly extending apertures 36 that are suitably arranged around each bore 20 for selectably receiving a dowel pin 38 that is slip fitted therein and which also cooperates with the component 10 for correctly positioning it upon the sub-plate 12.

The component 10 includes a hollow box housing 40 that is provided on its bottom surface with appropriate apertures 42 and 44 for receiving the dowel pins 34 and 38 for positioning the component 10 on the sub-plate 12. A locator means 46 is adapted to extend downwardly into the bore 42 for journaling therein and to extend upwardly through a suitable vertically extending aligned bore 48 provided in the upper portion of the hollow housing 40 and to provide a suitable adjustable support and locating point for the workpiece 14. The locator means 46 includes a vertically extending shaft 50 that is slip fitted into the bore 42 and an upper threaded portion 52 upon which is threaded a suitable support nose member 54 which may have a slight curvature at its top 55. The support member which contacts the workpiece 14 is provided with at least one longitudinally extending relieved portion 56 which receives a suitable set screw or lock key 58 that is removably positioned in the upper portion of the hollow housing 40 to preclude rotational movement of the support nose 54 when the shaft 50 is rotated.

It will be seen that as the shaft 50 is rotated in a predetermined direction that it turns within the complementarily threads support nose 54 but since the lock key 58 precludes the support nose member 54 from rotating, the support nose member 54 is caused to move in a predetermined vertical direction. It is also to be understood that it is within the scope of this invention to provide support nose members 54 of varying length in order to increase the flexibility of the application of the novel supporting and locating component 10.

A gear means 60 is contained within the box housing 40 and is adapted to cooperate with the housing 40 and the locator means 46 to vertically position the locator means 46 in a predetermined vertical direction. In the illustrated preferred embodiment of the present invention, this gear means 60 takes the form of a first bevel gear 62 that is vertically arranged within the housing 40 and which is suitably secured to a suitable drive shaft 64 that extends through a horizontally extending bore 66 that is provided in a sidewall 68 of the housing 40. A suitable thrust washer 70 is interposed between the sidewall 68 and the bevel gear 62. The drive shaft 64 is preferably hollow and is provided with a suitable end such as the illustrated hexagon head 72. A suitable lock screw 74 is threadedly disposed within the drive shaft 64 and has a friction plug 76 constructed of copper or equivalent suitable material disposed at the inner end thereof for frictionally engaging the locator pin 50 and precluding inadvertent movement of the pin 50 after set up of the component 10 on the sub-plate 12. The lock screw 74 is provided also with a particularly configured outer end 78 such as a hexagonal shape for cooperation with a suitable drive wrench means.

The first vertically disposed bevel gear 62 cooperates with a second bevel gear 80 that is fixed to the locator shaft 50 and which is spaced from the lower portion of the box housing 40 by a suitable thrust washer 82. It is to be understood that as the first bevel gear 62 is caused to rotate in a predetermined direction that the associated second bevel gear 80 is in turn caused to rotate in the opposite direction and as it does the locator pin 50 attached to the second bevel gear 80 also rotates therewith and causes the support nose member 54 to move in a predetermined vertical direction to provide a precise locating point for the workpiece 14.

Figure 2:
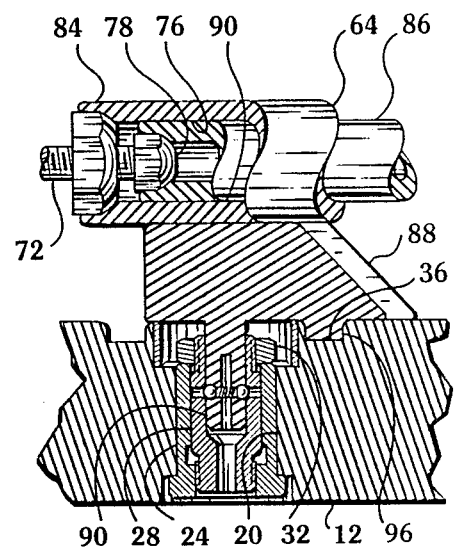
FIG. 2 is a section of a guide means which may be used advantageously with the indexing and locating component of FIGS. 1 and 2 to operate the component from a remote position.
Figure 3:
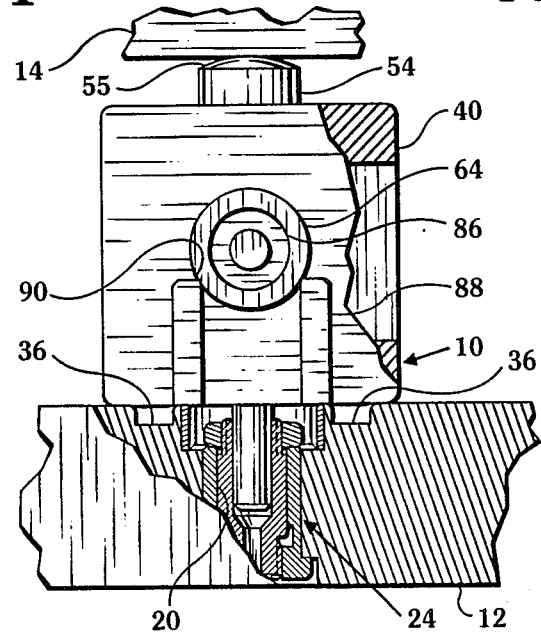
FIG. 3 is an end view of the indexing and locating component illustrated in FIG. 2.

Referring now to FIGS. 2 and 3 a suitable guide means will be illustrated for the purpose of providing a means of actuating the component 10 from a remote position. It will be understood that the hollow drive shaft 64 has a configured head 72 that is received by a complementarily shaped socket head 86 for rotating the drive shaft 64 in a predetermined direction. The precise amount of movement of drive shaft 64 relative to socket head 86 in either direction can be determined by optional micrometer vernier graduation lines (not shown) located on the drive shaft and adjacent socket head. The socket head drive wrench 84 is hollow and is adapted to receive a lock screw drive means in the form of a socket wrench 86 that is adapted to receive the head 78 of the lock screw 74 for rotating it to a locking position. The guide means provides support for the socket drive wrench 84 when, because of the particular tool set up, it is necessary to operate the component 10 from a remote or critical hard to reach location. This guide means takes the form of a guide block 88 that has a first downwardly extending member 90 that is adapted to be received by the inner bushing 26 and a second downwardly extending member 92 that is adapted to be received by an upwardly extending aperture 36 formed in the sub-plate 12. Thus, the guide block 88 is precluded from horizontal or rotational movement on the sub-plate 12 as was the tooling component 10. The guide block 88 is provided on its upper portion with a horizontally extending arcuate relieved portion 90 that is particularly configured to receive the drive wrench 84. Thus, the drive wrench 84 is supported when it is desired to operate the component from a remote location. The guide block 88 also permits ease of alignment of the socket head of the wrench 84 with the configured head 72 of the shaft 64 and alignment of the locking socket drive 86 with head 78 of the lock screw 74. If desired or necessary additional guide blocks 88 may be provided on the sub-plate 12 for supporting the drive wrench 84 and various extension of the wrench 84 and the wrench 86 may also be provided.

In use it will be seen that the component 10 will be positioned on the sub-plate 12 and the drive wrench 84 rotated to rotate the drive shaft 64 in a desired direction. The rotation of the drive shaft 64 rotates the first bevel gear 62 that in turn rotates the second bevel gear 62 and the associated locator pin 46. Rotation of the locator pin 46 causes the support nose member 54 to move upwardly into contact with the workpiece 14 and to provide a precise locating point for the tooling set up. When the precise locating point has been established, the locking socket wrench 86 engages the configured head of the lock screw 74 and drives the plug end thereof into frictional locking engagement with the locator pin 50 to preclude movement thereof.

It can thus be seen that the present invention provides an easily removable and replaceable locating pin for locating a workpiece on a fixture and greatly facilitating the machining thereof.

While I have described my invention in connection with a certain preferred embodiment thereof and have use, therefore, certain specific term in connection with certain specific examples of my invention, it is to be understood that the present disclosure is illustrative rather than restrictive and that tooling components having varying configuration may be resorted to without departing from the spirit or scope of the claims which follow.

I claim:

1. A supporting and locating tooling component adapted to be used with a sub-plate for precision machining of parts and comprising:
   a hollow box means that is adapted to be positioned upon the upper planar surface of a sub-plate in a predetermined position;
   a locator means extending slidably through as upper portion of the box housing means adapted to extend above the upper portion of the box housing means and adapted to extend above the upper surface of the sub-plate for supporting and locating a production part that is positioned on the sub-plate for machining; and
   gear means contained within the box housing means and adapted to cooperate with the box housing means and the locator means to vertically position the locator means in a predetermined vertical position, said gear means includes a vertically disposed bevel gear that cooperates with a horizontally disposed bevel gear that cooperate with the locator means to cause the locator means to vertically move with respect to the upper surface of the sub-plate to provide a predetermined locating point for a workpiece to be positioned and supported a predetermined vertical distance above the sub-plate, said gear means further includes a shaft drive means that extends horizontally through a wall of the box housing means and cooperates with the vertically disposed bevel gear and thereby causes the associated locator means to be moved vertically to said predetermined locating point;
   said locator means includes an actuator rod that is secured to the horizontally disposed bevel gear for rotation therewith and which cooperates with a support nose that is vertically positioned by rotation of said actuator rod to provide a precise locating point for a workpiece a predetermined distance above the upper surface of the sub-plate, said actuator rod and the support noise are threadably connected and the support noise is precluded from rotational movement whereby as the actuator is rotated the support nose is caused to move in a predetermined vertical direction.

2. The supporting and locating component of claim 1 wherein the hollow box housing means is adapted to cooperate with a dowel pin vertically extending from the upper surface of the sub-plate to index the component on said sub-plate.

3. The supporting and locating tooling component of claim 2 wherein a plurality of vertically extending dowel pins are provided to index and lock the tooling component horizontally on the upper surface of said sub-plate.

4. A supporting and locating tooling component adapted to be used with a sub-plate for precision machining of parts and comprising:
   a hollow box housing means that is adapted to be positioned upon the upper planar surface of a sub-plate in a predetermined position;
   a locator means extending slidably through an upper portion of the box housing means and adapted to extend above the upper portion of the box housing means and adapted to extend above the upper surface of the sub-plate for supporting and locating a production part that is positioned on the sub-plate for machining;
   gear means contained within the box housing means and adapted to cooperate with the box housing means and the locator means in a predetermined vertical position, said gear means includes at least two bevel gears one of which is vertically disposed and the other which is horizontally disposed that cooperate with the locator means to cause the locator means to vertically move with respect to the upper surface of the sub-plate to provide a predetermined locating point for a workpiece to be positioned a predetermined vertical distance above the sub-plate; and
   said gear means further includes a shaft drive means that extends horizontally through a wall of the box housing means and cooperates with the vertically disposed bevel gear and thereby causes associated locator means to be moved vertically to a predetermined position said shaft drive means is hollow and a second drive means is insertable through said rive means to rotatingly engage a lock screw that may be driven into frictional locking engagement with the locator means.

5. The supporting and locating tooling component of claim 4 wherein the locator means includes an actuator rod that is secured to the horizontally disposed bevel gear for rotation therewith and which cooperates with a support nose that is vertically positioned by rotation of said actuator rod to provide a precise locating point for a workpiece a predetermined distance above the upper surface of the sub-plate.

6. The supporting and locating tooling component of claim 5 wherein the actuator rod and the support nose are threadably connected and the support nose is precluded from rotational movement whereby as the actuator is rotated the support nose is caused to move in a predetermined vertical direction.

7. The supporting and locating tooling component of claim 6 wherein the support nose is provided with at least one longitudinally extending relieved portion and the housing is provided in its upper portion with a removable pin that extends int said relived portion to preclude rotation of the support nose as the actuator rod is rotated thereby causing the support nose to move vertically.

8. The supporting and locating tooling component of claim 4 wherein the hollow box housing means is adapted to cooperate with a dowel pin vertically extending from the upper surface of the sub-plate to index the component on said sub-plate.

9. The supporting and locating tooling component of claim 8 wherein a plurality of vertically extending dowel pins are provided to index and lock the tooling component horizontally on the upper surface of the sub-plate.

10. The supporting and locating tooling component of claim 4 which further includes support means positionable upon the upper surface of the sub-plate in a predetermined position; and wrench drive means which are supportable by said support means and that cooperate with the gear means of the tooling component to permit vertical adjustment of the locator means from a position remote to said component.

11. The supporting and locating tooling component of claim 1 which further includes support means positionable upon the upper surface of the sub-plate in a predetermined position; and
  wrench drive means which are supportable by said support means and that cooperate with the gear means of the tooling component to permit vertical adjustment of the locator means from a position remote to said component.

12. The supporting and locating tooling component of claim 1 wherein the support nose is provided with at least one longitudinally extending relieved portion and the housing is provided in its upper portion with a removable pin that extends into said relieved portion to preclude rotation of the support nose as the actuator rod is rotated thereby causing the support nose to move vertically.

* * * * *